US009587702B2

(12) United States Patent
Witwer et al.

(10) Patent No.: US 9,587,702 B2
(45) Date of Patent: Mar. 7, 2017

(54) VIBRATION ISOLATOR USING EXTERNALLY PRESSURIZED SEALING BELLOWS AND AN EXTERNAL SHAFT

(71) Applicant: HONEYWELL INTERNATIONAL INC., Morristown, NJ (US)

(72) Inventors: Kevin Witwer, Glendale, AZ (US); Ken Young, Peoria, AZ (US); Timothy Hindle, Peoria, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 162 days.

(21) Appl. No.: 14/182,827

(22) Filed: Feb. 18, 2014

(65) Prior Publication Data

US 2015/0233441 A1    Aug. 20, 2015

(51) Int. Cl.
*F16F 9/26* (2006.01)
*F16F 9/16* (2006.01)
(Continued)

(52) U.S. Cl.
CPC ............... *F16F 9/16* (2013.01); *F16F 9/049* (2013.01); *F16F 9/26* (2013.01); *F16F 9/52* (2013.01)

(58) Field of Classification Search
CPC .......... F16F 9/04; F16F 9/0418; F16F 9/0436; F16F 9/0472; F16F 9/049; F16F 9/14; F16F 9/16; F16F 9/18; F16F 9/22; F16F 9/26
See application file for complete search history.

(56) References Cited

U.S. PATENT DOCUMENTS

| 2,919,883 A | 1/1960 | Murphy |
| 2,942,838 A | 6/1960 | Peters |

(Continued)

FOREIGN PATENT DOCUMENTS

| DE | 2935935 B1 | 2/1981 |
| DE | 19626548 A1 | 1/1998 |

(Continued)

OTHER PUBLICATIONS

Extended EP Search Report for Application No. 15152949.2-1755/2905504 dated Oct. 20, 2015.

(Continued)

*Primary Examiner* — Nicholas J Lane
(74) *Attorney, Agent, or Firm* — Lorenz & Kopf, LLP

(57) ABSTRACT

An apparatus is provided for vibration damping and isolation. The apparatus includes a housing having an inner surface defining a passage therethrough, a first bellows disposed within the housing passage, the first bellows having an outer surface and spaced apart from the housing inner surface to define a first chamber having a volume, and a second bellows disposed within the housing passage, the second bellows having an outer surface and spaced apart from the housing inner surface to define a second chamber having a volume. The apparatus further includes a restrictive flow passage in fluid communication with the first and second chambers, fluid disposed within the first chamber, the second chamber, and the restrictive flow passage, and a shaft positioned externally to the housing and coupled with the first bellows and the second bellows. The shaft is configured to selectively receive a force to thereby move the fluid through the restrictive flow passage to increase the first chamber volume and decrease the second chamber volume or to decrease the first chamber volume and increase the second chamber volume.

10 Claims, 4 Drawing Sheets

(51) Int. Cl.
*F16F 9/52* (2006.01)
*F16F 9/04* (2006.01)

(56) References Cited

U.S. PATENT DOCUMENTS

| | | | |
|---|---|---|---|
| 4,572,488 A * | 2/1986 | Holmberg, Jr. | B64G 1/50 |
| | | | 188/298 |
| 4,815,574 A * | 3/1989 | Taylor | F16F 9/361 |
| | | | 188/269 |
| 5,305,981 A * | 4/1994 | Cunningham | B64G 1/283 |
| | | | 244/173.2 |
| 5,332,070 A * | 7/1994 | Davis | F16F 9/16 |
| | | | 188/280 |
| 5,873,438 A | 2/1999 | Osterberg et al. | |
| 6,082,508 A | 7/2000 | Davis | |
| 6,131,709 A | 10/2000 | Jolly et al. | |
| 6,217,011 B1 | 4/2001 | Redinger | |
| 6,352,249 B2 | 3/2002 | Muramatsu et al. | |
| 6,390,254 B1 | 5/2002 | Bennett et al. | |
| 6,517,060 B1 | 2/2003 | Kemeny | |
| 6,896,109 B2 * | 5/2005 | Kelso | F16F 9/535 |
| | | | 188/267.1 |
| 7,182,188 B2 | 2/2007 | Ruebsamen et al. | |
| 7,802,777 B2 | 9/2010 | Katayama et al. | |
| 7,905,470 B2 | 3/2011 | Kojima | |
| 7,931,258 B2 | 4/2011 | Russell et al. | |
| 8,006,965 B2 | 8/2011 | Kojima | |
| 8,113,321 B2 | 2/2012 | McGuire et al. | |
| 8,240,641 B2 | 8/2012 | McGuire | |
| 8,308,147 B2 | 11/2012 | Kojima et al. | |
| 8,444,121 B2 | 5/2013 | Hadden et al. | |
| 2005/0103587 A1 | 5/2005 | Fischer | |
| 2005/0217954 A1 | 10/2005 | Hindle et al. | |
| 2012/0267506 A1 | 10/2012 | Hadden et al. | |
| 2015/0226282 A1 * | 8/2015 | Hindle | F16F 9/361 |
| | | | 188/297 |

FOREIGN PATENT DOCUMENTS

| | | | |
|---|---|---|---|
| EP | 0130826 A1 * | 1/1985 | F16F 9/16 |
| FR | 952367 A | 11/1949 | |
| FR | 2333168 A1 | 6/1977 | |
| GB | 1175255 A * | 12/1969 | F16F 9/26 |

OTHER PUBLICATIONS

Extended European Search Report for Application No. 15153674.5-1755/2921741 dated Mar. 12, 2015.
USPTO Office Action for U.S. Appl. No. 14/177,916 dated Jan. 14, 2016.
USPTO Office Action for U.S. Appl. No. 14/177,916 dated Nov. 4, 2015.

* cited by examiner

VIBRATION ISOLATOR USING EXTERNALLY PRESSURIZED SEALING BELLOWS AND AN EXTERNAL SHAFT

TECHNICAL FIELD

The present invention generally relates to vibration damping and isolation systems, and more particularly relates to isolators.

BACKGROUND

A precision pointing system carrying a sensor, such as a telescope as its payload, may be susceptible to disturbances that produce structural vibrations and, consequently, pointing errors. Such vibrations may be attributed to mechanical components or assemblies, such as reaction wheel assemblies that are used as actuators in the precision pointing system. For the most part, because these systems tend not to have significant, inherent damping, these structural vibrations may degrade system performance and even cause structural fatigue over time. Therefore, an efficient means of providing damping and isolation to the system may be needed.

Typically, to minimize performance degradation caused by vibrations, a passive damping and isolation system is used for damping the structure and isolating the payload carried by a precision isolation system. One example of a passive damping and isolation system is the D-STRUT™ isolation strut, manufactured by Honeywell International Inc. of Morristown, N.J. The D-STRUT™ isolation strut is a three-parameter vibration isolation system that mechanically acts like a spring ($K_A$) in parallel with a series spring ($K_B$) and damper ($C_A$) and is disclosed in U.S. Pat. No. 5,332,070 entitled "Three Parameter Viscous Damper and Isolator" by Davis et al. This patent is hereby incorporated by reference.

The D-STRUT™ isolation strut includes a hollow shaft and a piston that is configured to move relative to the shaft. The piston includes a flange that extends radially from a midsection thereof. The flange has a top surface that is coupled to a first sealed bellows and a bottom surface that is coupled to a second sealed bellows. Each of the bellows has a chamber that is filled with fluid. Thus, when the piston moves axially through the shaft, fluid flows from one of the bellows chambers to the other.

Although the conventional D-STRUT™ isolation strut operates effectively in most applications, it may not be appropriate to implement in other applications. For example, in some implementations that require a low-viscosity ("thin") fluid and are required to accommodate relatively large rotations, a configuration using the conventional shaft between the bellows chambers may not be suitable. The reason for using a low viscosity fluid is to permit operation in lower temperature environments (lower pour point and lower temp at which gelling occurs).

Accordingly, it is desirable to have an isolation strut that is capable of damping and isolating vibration. In addition, it is desirable for the isolation strut to be usable with a low-viscosity fluid and to accommodate large rotations. Moreover, it is desirable for the isolation strut to have a simple configuration that is relatively inexpensive to implement. Furthermore, other desirable features and characteristics of the present invention will become apparent from the subsequent detailed description of the invention and the appended claims, taken in conjunction with the accompanying drawings and this background of the invention.

BRIEF SUMMARY

An apparatus is provided for vibration damping and isolation. In one exemplary embodiment, the apparatus includes a housing having an inner surface defining a passage therethrough, a first bellows disposed within the housing passage, the first bellows having an outer surface and spaced apart from the housing inner surface to define a first chamber having a volume, and a second bellows disposed within the housing passage, the second bellows having an outer surface and spaced apart from the housing inner surface to define a second chamber having a volume. The apparatus further includes a restrictive flow passage in fluid communication with the first and second chambers, fluid disposed within the first chamber, the second chamber, and the restrictive flow passage, and a shaft positioned externally to the housing and coupled with the first bellows and the second bellows. The shaft is configured to selectively receive a force to thereby move the fluid through the restrictive flow passage to increase the first chamber volume and decrease the second chamber volume or to decrease the first chamber volume and increase the second chamber volume.

This brief summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. While the isolation struts are discussed with reference to exemplary embodiments, any one of numerous other embodiments of a fluid filled isolation strut may be implemented as well. Fluid, as used in the present invention, can be any viscous liquid or any gas known in the art. Furthermore, there is no intention to be bound by any expressed or implied theory presented in the preceding technical field, background, brief summary, or the following detailed description.

Embodiments of the present disclosure are generally directed to improved vibration isolation and damping systems. The disclosed embodiments take the conventionally-employed internal through-shaft out of the damper and wrap it around the entire damper housing. Thus, instead of an annulus used for damping that a through-shaft provides, the damping will now come from an annular orifice. The external through-shaft provides the same relative motion that the conventional, internal through-shaft configuration would provide. As such, the systems can a) have very thin fluid for cold temperature environments and b) handle large rotations that with the conventional internal through-shaft would prove unattainable.

Figure 1:
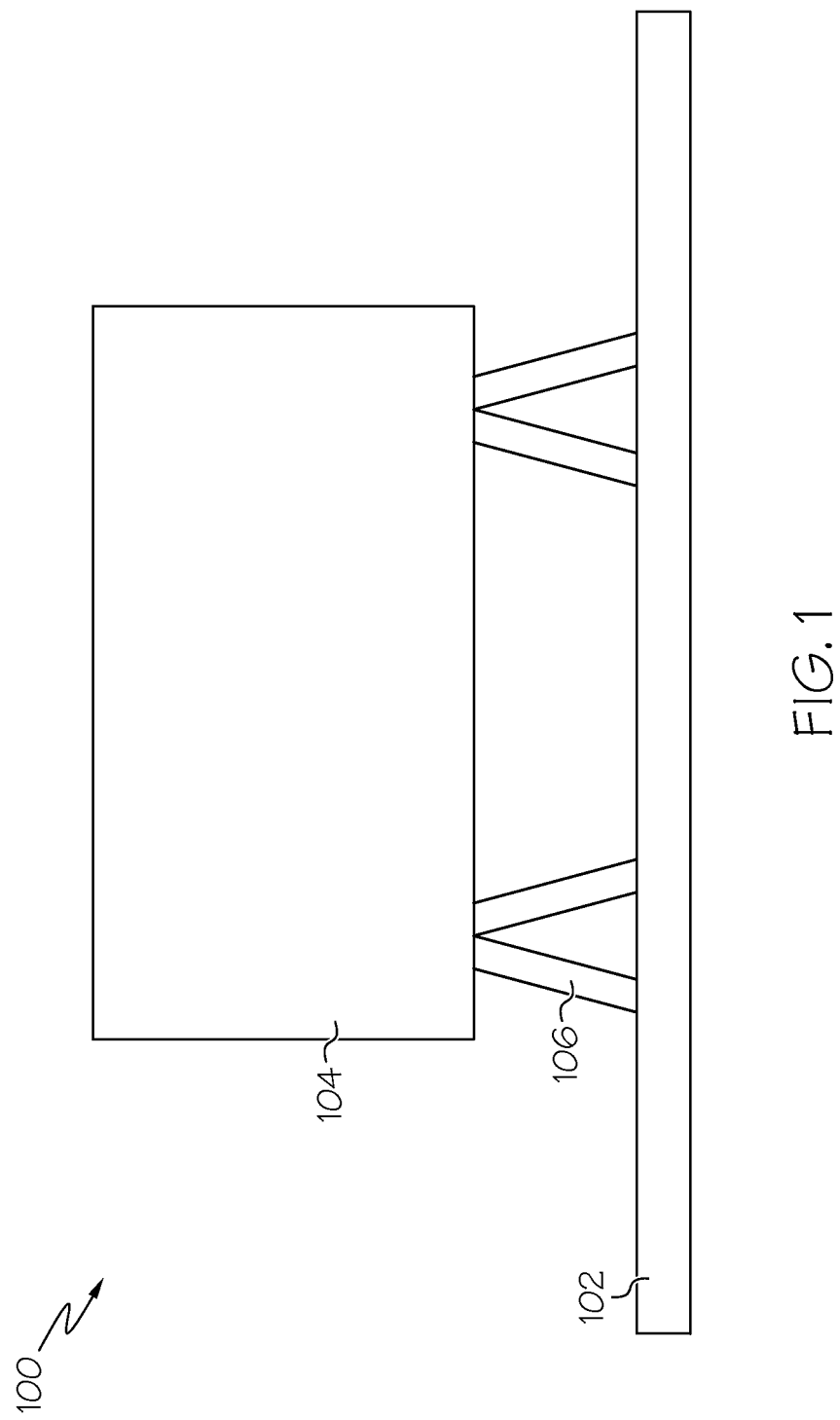
FIG. 1 is a schematic of an exemplary system having vibration damping and isolation.

FIG. 1 illustrates an exemplary system having vibration damping and isolation. The system 100 may be implemented in any one of numerous environments, such as in space, terrestrially, or under water. The system 100 includes a base 102, a payload 104, and at least one vibration isolation apparatus 106. The base 102 is configured to provide a platform to which the payload 104 and vibration isolation apparatus 106 are coupled and may be any one of numerous application-appropriate devices. For example, in a space application, the base 102 can be a satellite, an arm of a satellite, a space station, or any one of numerous other conventionally-used space apparatus. The payload 104 is a device that preferably needs vibration damping and isolation to operate effectively. The payload 104 may be any one of numerous devices, such as, for example, a telescope, or a camera.

The vibration isolation apparatus 106 dampens and isolates vibration that may be experienced by the payload 104 and thus, is coupled between the payload 104 and the base 102. Although a single vibration isolation apparatus 106 may be used, it may be preferable to employ more than one vibration isolation apparatus 106. In one exemplary embodiment, three vibration isolation apparatus 106 are used in a three-point-mount configuration to isolate vibration. In another exemplary embodiment, six vibration isolation apparatus 106 are implemented in a hexapod configuration to provide vibration isolation. In still another exemplary embodiment, eight vibration isolation apparatus 106 are implemented in an octopod configuration to provide vibration isolation. In the embodiments described above, vibration isolation is provided in six degrees of freedom.

Figure 2:
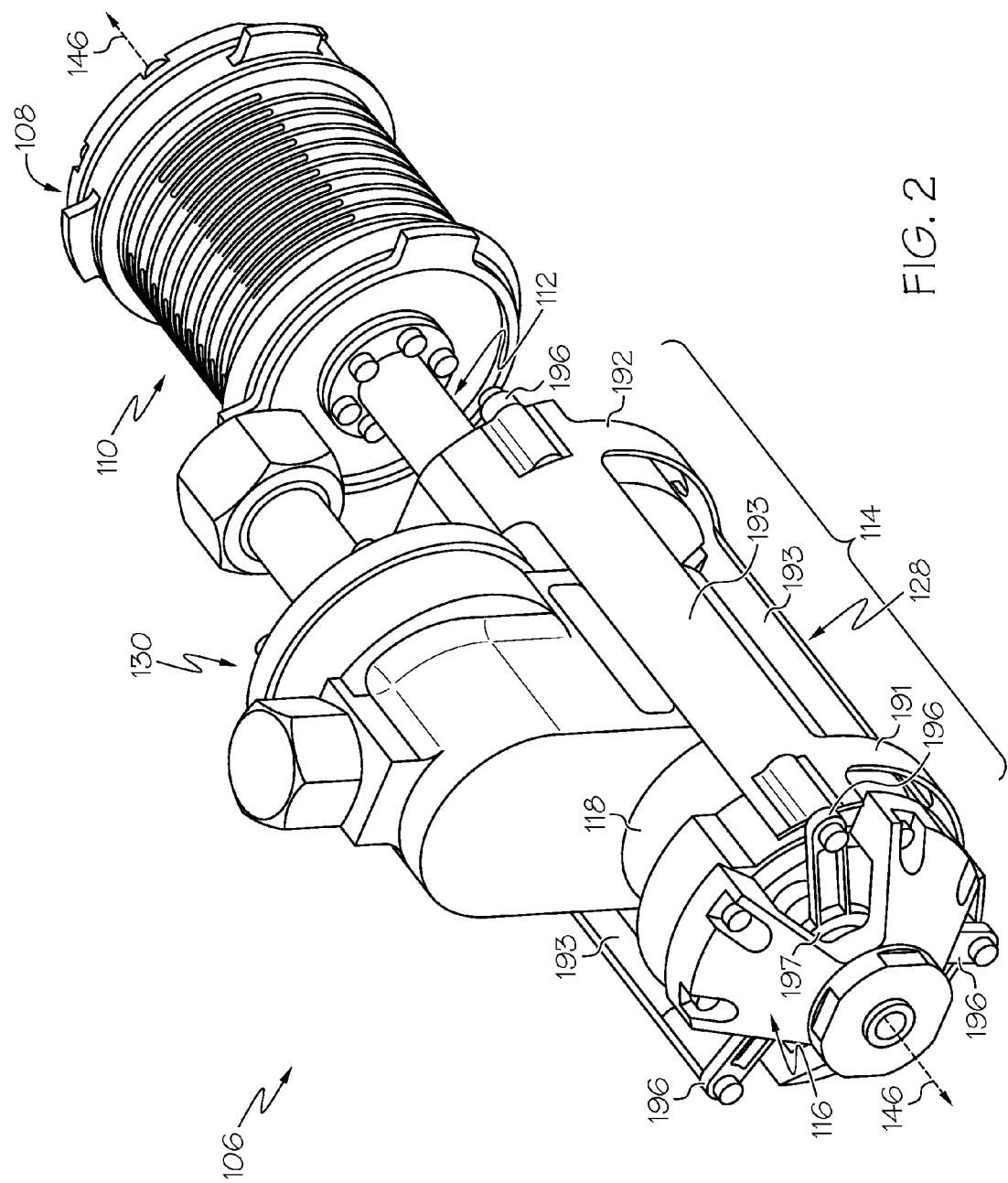
FIG. 2 is an isometric projection view of an exemplary vibration damping system in accordance with various embodiments of the present disclosure.
Figure 3:
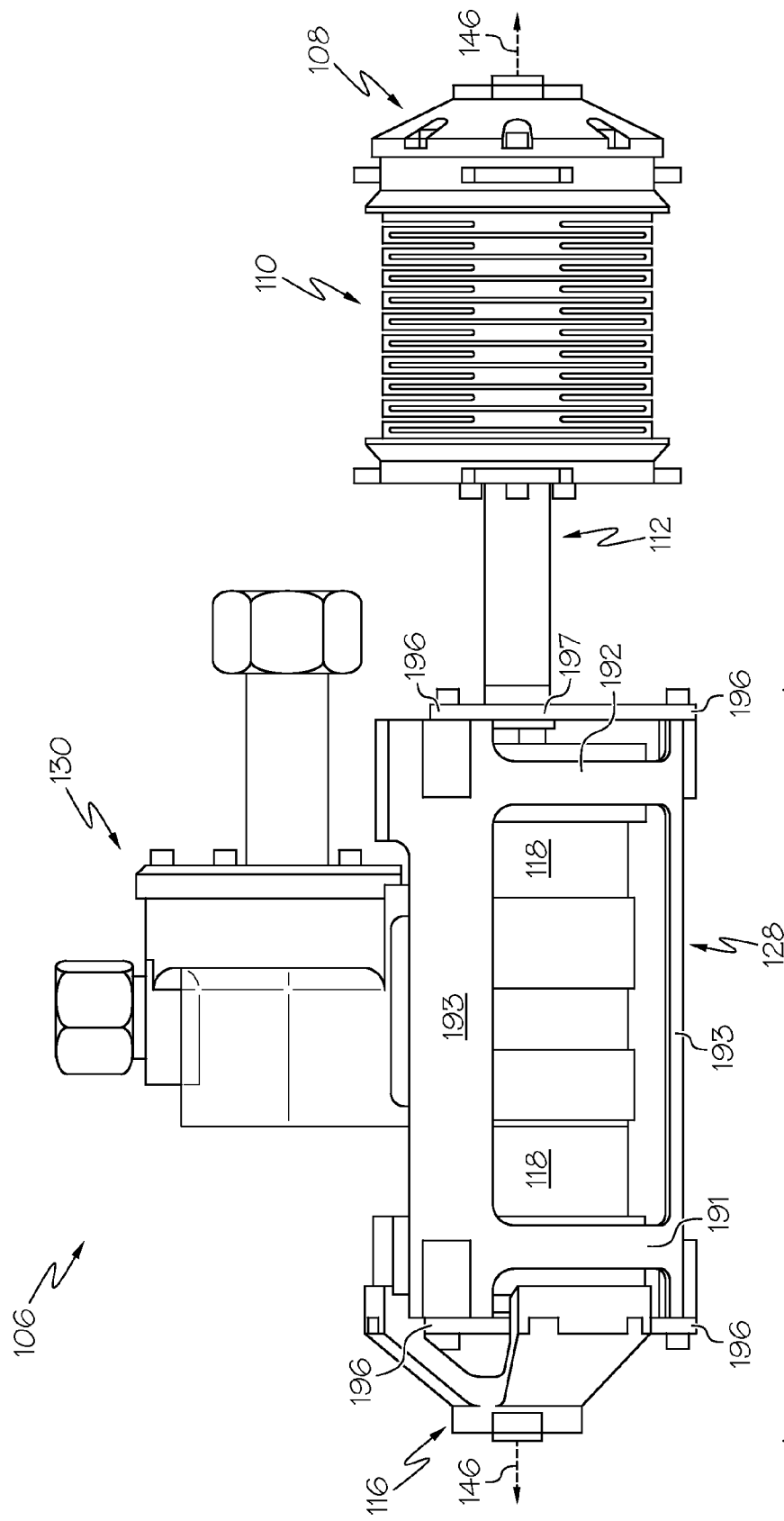
FIG. 3 is a side view of the exemplary vibration damping system shown in FIG. 2.
Figure 4:
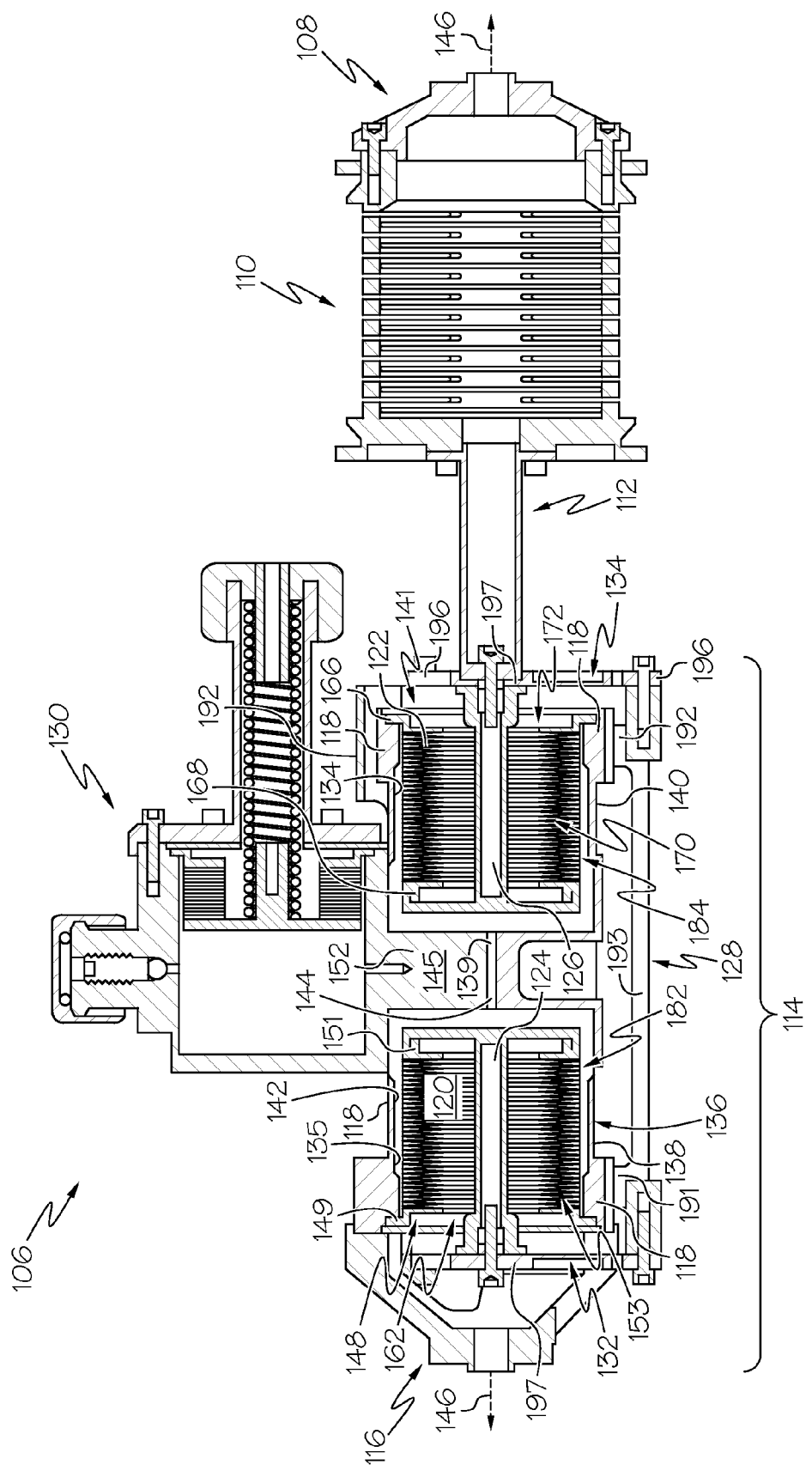
FIG. 4 is a cross-sectional view of the exemplary vibration damping system based on the side view shown in FIG. 3.

With reference now to FIGS. 2-4, one exemplary vibration isolation apparatus 106 is provided. The vibration isolation apparatus 106 includes a first support 108, a tuning spring 110, a stinger piece 112, a damper assembly 114, and a second support 116. The second support 116 receives vibratory motion from the base 102 and couples the base 102 to the vibration isolation apparatus 106. The damper assembly 114 is coupled to the second support 116, and provides the damping associated with the vibration isolation apparatus 106. Damper assembly 114 is coupled to stinger piece 112, which is coupled to the tuning spring 110. Tuning spring 110 is coupled to the first support 108, which in turn couples the vibration isolation apparatus to the payload 104. The series combination of the first support 108, tuning spring 110, stinger piece 112, damper assembly 114, and second support 116 provide the desired three-parameter vibration isolation properties (Ka, Kb, and Ca parameters).

The damper assembly 114 includes an assembly housing 118, a first bellows 120, a second bellows 122, a first shaft 124, a second shaft 126, an external shaft 128, fluid and, optionally, a temperature compensation device 130. The first shaft 124 is coupled to the external shaft 128 via first connection member 132. The second shaft is couple to the external shaft via second connection member 134. The series connections of first shaft 124, first connection member 132, external shaft 128, second connection member 134, and second shaft 126 are designed to rigidly couple the ends of the first bellows 120 and second bellows 122, such that extension of one of the bellows results in equal compression to the other bellows.

The assembly housing 118 is configured to operate with the other components of the damper assembly 114 to provide a fixed volume of space and to enclose and seal the fluid therein. The assembly housing 118 includes at least a tubular structure 136 that has a first end 138, a second end 140, and an inner surface 142 that connects with a passage 144 extending between the first and second ends 138, 140. The assembly housing 118 also includes a longitudinal axis 146 along which the vibration is received and the vibration is damped. Preferably, the first end 138 includes an inlet 148, the second end 140 includes an outlet 141, and the tube 136 has no openings other than the inlet 148 and outlet 141. However, in alternate embodiments, the tube 136 may be a single component having endwalls integrally formed or coupled to each of the first and second ends 138, 140.

In one exemplary embodiment, the assembly housing 118 includes a damping plate 152 disposed in the middle thereof. The damping plate 152 is integrally formed or integrated as part of the assembly housing 118 and includes the passage 144 that extends through the damping plate 152.

The first bellows 120 is disposed within the assembly housing 118 and is preferably configured to move along the longitudinal axis 146. The first bellows 120 is coupled at one end to a first end plate 149 and at an opposite end to a second end plate 151 to thereby define first bellows interior cavity 153 therebetween. The first end plate 149 sealingly mates with the assembly housing first end 138 and couples the first bellows 120 thereto. The second end plate 151 couples to the first shaft 124 that is disposed within the first bellows interior cavity 153. The first shaft 124 is configured to provide structural support for the first bellows 120 and guides the first bellows 120 along the longitudinal axis 146 during operation. It will be appreciated that the first end plate 149 includes an opening 162 formed therein that is configured to accommodate components that may extend outside of the assembly housing 118, such as the first shaft 124.

Similar to the first bellows 120, the second bellows 122 is disposed within the assembly housing 118, is coupled to a first and a second end plate 166, 168, and is preferably configured to move along the longitudinal axis 146. Although depicted as being capable of traveling along the same axis 146 as the first bellows 120, it will be appreciated that in other non-illustrated embodiments the second bellows 122 may move along any other suitable axis. The second bellows first end plate 166 sealingly mates with the assembly housing second end 140 and couples the second bellows 122 thereto. The second bellows second end plate 168 is coupled to the opposite end of the second bellows 122 and, together with the first end plate 166 and inner surface of the second bellows 122, defines an interior cavity 170. The second end plate 168 couples to a second shaft 126 that is disposed within the second bellows interior cavity 170. The second shaft 126 is configured to provide structural support for the second bellows 122 and guides the second bellows 122 along the longitudinal axis 146 during operation. The second shaft 126 also couples with the stinger piece 112. Just as above, the first end plate 166 includes opening 172 formed therein that are configured to provide space for disposal of components that may extend outside of the assembly housing 118, in this case, the second shaft 126.

The isolation assembly also includes an external shaft 128. The external shaft 128 is positioned exterior to the assembly housing 118. The external shaft 128 includes first and second annular portions 191 and 192. First annular portion 191 extends at least part-way around the first end 138, and the second annular portion 192 extends at least part-way around the second end 140. The shaft 190 further includes at least one, and preferably two, three, or more longitudinal portions 193 that extend parallel to axis 146 longitudinally between the first and second annular portions 191, 192, exterior to assembly housing 118. The external shaft 128 is coupled to the first and second bellows 120, 122. The external shaft 128 couples to the first bellows 120 via the rigid, first connection member 132 and the first shaft 124. The external shaft 128 couples to the second bellows 122 via the rigid, second connection member 134 and the second shaft 126. Preferably, the rigid connection members 132, 134 are configured as a structure having multiple extending portions 196, the number of extending portions 196 being the same as the number of longitudinal portions 193. Each extending portion 196 connects, at one end, with the external shaft 128 at a point that is roughly adjacent to an end of a respective longitudinal portion 193. Each extending portion 196 connects, at the other end thereof, with the other extending portions 196, at a center portion 197 of the members 132, 134. The first connection member 132 is coupled with first bellows 120 via a sliding association over first shaft 124, and via abutting contact with the second end plate 151, at the center portion 197 thereof. The second connection member 134 is coupled with the second bellows 122 via a sliding association over second shaft 126, and via abutting contact with the second end plate 168, at the center portion 197 thereof. The second connection member 134 is further coupled with the stinger piece 112 at the center portion thereof. The external shaft 128 is configured to operate with the first and second bellows 120, 122 to damp and isolate vibration received from the stinger piece 112. Other configurations of external shaft 128 that accomplish the same function as the exemplary configuration illustrated in the figures will also be appreciated by those having ordinary skill in the art.

As briefly mentioned previously, the damper assembly 114 components are preferably configured to operate together to sealingly enclose the fluid therein in a fixed volume of space. The volume of space is separated into subvolumes, each of which is disposed in a first chamber 182, a second chamber 184, and the restrictive flow passage 139. The first chamber 182 is defined by a portion of the assembly housing inner surface 135 and an outer surface of the first bellows 120, as well as second end plate 151 and first shaft 124, and the second chamber 184 is defined by another portion of the assembly housing inner surface 135 and an outer surface of the second bellows 122, as well as second end plate 168 and second shaft 126. The restrictive flow passage 139 allows the first and second chambers 182, 184 to communication with one another and may have any one of numerous configurations. In one exemplary embodiment, the restrictive flow passage is configured as a cylindrical duct through the damping plate 152. No matter the particular configuration, the first chamber 182, second chamber 184, and restrictive flow passage 139 are filled with fluid. Thus, during the operation of the damper assembly 114, when a force is exerted on the assembly housing 118 (for example from second support 116), fluid is pushed from the second chamber 184, through the restrictive flow passage 139, into the first chamber 182.

The temperature compensation device 130 may be included in the damper assembly 114 to compensate for fluid expansion and/or contraction in response to temperature changes. The temperature compensation device 130 may have any one of numerous suitable configurations and may be disposed within the damper assembly 114 in any one of numerous manners.

There has now been provided a vibration isolator that is capable of damping and isolating vibration. In addition, the isolation strut is usable with a thin fluid and to accommodate large rotations. Moreover, the isolation strut has a simple configuration that is relatively inexpensive to implement.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A damping system, comprising:
   a cylindrical housing having an inner surface defining a passage therethrough, the cylindrical housing having a proximal and distal end of the cylinder, the housing passage having a first end and a second end, and a restrictive flow passage that has a smaller diameter than a diameter of either the first end or the second end;
   a first bellows disposed within the first end of the housing passage, the first bellows having an outer surface and spaced apart from the housing inner surface at the first end of the housing passage to define a first chamber having a volume, the first bellows being connected with a first piston and a first damper shaft;
   a second bellows disposed within the housing passage, the second bellows having an outer surface and spaced apart from the housing inner surface at the second end of the housing passage to define a second chamber having a volume, the second chamber being spaced apart from the first chamber by the restrictive flow passage, the second bellows being connected with a second piston and a second damper shaft;
   the restrictive flow passage in fluid communication with the first and second chambers, the restrictive flow passage defining a longitudinal axis of the damping system about which both the first and second bellows are also disposed, and comprising a central portion of the housing passage between the first chamber and the second chamber;
   fluid disposed within the first chamber, the second chamber, and the restrictive flow passage;
   an external shaft positioned radially from the longitudinal axis externally to the housing and at a greater radius with respect to the housing from the longitudinal axis, and coupled with the first bellows via the first damper shaft and a first connection member longitudinally spaced apart from the proximal end and connected to the first damper shaft and the second bellows via the second damper shaft and a second connection member longitudinally spaced apart from the distal end and connected to the second damper shaft, wherein the external shaft moves slidingly with respect to the housing while coupled with the first and second bellows as the first and second bellows move longitudinally, the shaft configured to selectively receive a longitudinal force to thereby move the fluid through the restrictive flow passage to increase the first chamber volume and decrease the second chamber volume or to decrease the first chamber volume and increase the second chamber volume, wherein the external damper shaft is connected to each of the first and second connection members, and wherein the second connection member comprises a (i) central portion aligned with the longitudinal axis, (ii) a plurality of spokes extending radially from the central portion, each spoke being connected to the external shaft at said greater radius, and (iii) a plurality of spaces separating each spoke of the plurality of spokes from one another;

a first support located adjacent to the proximal end of the cylindrical housing and connected to the shaft such that vibration is translated between the first support and the shaft; and a second support connected distally to the distal end of the cylindrical housing such that vibration is translated between the second support and the cylindrical housing, wherein the second support is characterized as having (i) a central hub that is aligned with the longitudinal axis and spaced apart longitudinally from the cylindrical housing, (ii) a plurality of extension arms that extend both radially and longitudinally from the central hub and towards the distal end, each extension arm being coupled with the cylindrical housing at a different point along a perimeter of the distal end, and (iii) a plurality of spaces separating each extension arm of the plurality of extension arms from one another, wherein the plurality of spaces of the second connection member and the plurality of spaces of the second support are rotationally offset from one another with respect to the longitudinal axis such that upon sliding motion of the external shaft, the extension arms are able to pass through the plurality of spaces of the second support and the spokes are able to pass through the plurality of spaces of the second connection member.

2. The damping system of claim 1, wherein the shaft comprises first and second annular portions disposed annularly around the housing and a longitudinal portion connected between the first and second annular portions and disposed longitudinally along the housing.

3. The damping system of claim 2, wherein the shaft comprises a plurality of longitudinal portions.

4. The damping system of claim 1, further comprising: a damping plate disposed with the housing passage between the first and second bellows, the damping plate coupled to the housing inner surface and extending radially inward and including at least one duct formed therethrough, wherein at least a portion of the restrictive flow passage is defined by the at least one duct.

5. The damping system of claim 1, further comprising: a temperature compensator.

6. The damping system of claim 5, wherein the temperature compensator is disposed external to the housing, the temperature compensator configured to compensate for expansion and contraction of the fluid during temperature changes.

7. The damping system of claim 1, wherein the first bellows has an inner surface defining a first cavity therein, the first cavity enclosing a first support shaft, the first support shaft being slidingly associated with the external shaft.

8. The damping system of claim 7, wherein the second bellows has an inner surface defining a second cavity therein, the second cavity enclosing a second support shaft, the second support shaft being slidingly associated with the external shaft.

9. The damping system of claim 1, wherein the fluid comprises a liquid.

10. The damping system of claim 1, wherein the fluid comprises a gas.

* * * * *